(12) United States Patent
Steffner

(10) Patent No.: US 8,476,377 B2
(45) Date of Patent: Jul. 2, 2013

(54) CROSSLINKABLE POLYAMIDE MOLDING COMPOUNDS AND MOLDED PARTS PRODUCED THEREWITH

(75) Inventor: Klaus-Jürgen Steffner, Domat/Ems (CH)

(73) Assignee: EMS—Patent AG, Domat/EMS (CH)

( * ) Notice: Subject to any disclaimer, the term of this patent is extended or adjusted under 35 U.S.C. 154(b) by 724 days.

(21) Appl. No.: 12/158,902

(22) PCT Filed: Dec. 15, 2006

(86) PCT No.: PCT/EP2006/069771
§ 371 (c)(1),
(2), (4) Date: Dec. 2, 2008

(87) PCT Pub. No.: WO2007/074086
PCT Pub. Date: Jul. 5, 2007

(65) Prior Publication Data
US 2009/0171038 A1    Jul. 2, 2009

(30) Foreign Application Priority Data

Dec. 23, 2005 (EP) ..................................... 05112894

(51) Int. Cl.
*C08L 77/00* (2006.01)
*B29C 47/10* (2006.01)
*C08J 7/00* (2006.01)

(52) U.S. Cl.
USPC ............ 525/432; 428/220; 525/420; 525/424

(58) Field of Classification Search
USPC ............................ 525/420, 424, 432; 428/220
See application file for complete search history.

(56) References Cited

U.S. PATENT DOCUMENTS

| 2,858,259 | A | | 10/1958 | Lawton et al. |
| 4,291,142 | A | * | 9/1981 | Tamura et al. ................. 525/420 |
| 5,411,663 | A | * | 5/1995 | Johnson .................... 210/500.38 |
| 6,407,182 | B1 | | 6/2002 | Maul et al. |
| 6,943,231 | B2 | | 9/2005 | Buehler |
| 2006/0100334 | A1 | | 5/2006 | Ebert et al. |

FOREIGN PATENT DOCUMENTS

| DE | 10224947 A1 | 12/2003 |
| DE | 102006015721 A1 | 10/2006 |
| EP | 0007114 B1 | 1/1980 |
| EP | 0046954 A2 | 3/1982 |
| EP | 0837087 A1 | 4/1998 |
| EP | 1120443 A2 | 8/2001 |
| EP | 1416010 A2 | 5/2004 |
| EP | 1465308 A2 | 10/2004 |
| JP | 2003327726 A2 | 11/2003 |
| WO | 03037968 A1 | 5/2003 |

* cited by examiner

*Primary Examiner* — Ana Woodward
(74) *Attorney, Agent, or Firm* — Browdy and Neimark, PLLC

(57) ABSTRACT

The invention relates to crosslinkable, thermoplastic polyamide molding compounds. The polyamides are selected from a group comprising amorphous or microcrystalline polyamides, copolyamides thereof and blends thereof, as well as blends of such polyamides with semicrystalline polyamides. A polyamide molding compound according to the invention is characterized in that it comprises a crosslinking additive which causes the production of crosslinked molded parts formed from said polyamide molding compound under the effect of high-energy irradiation, having a Tg value of >140° C. and a minimum dimensional stability of 90% at temperatures of ≧180° C. These polyamides have a substantially linear structure and the monomers thereof have no olefin C═C double bonds. Corresponding crosslinked polyamide molded parts produced from a polyamide molding compound and the use of this polyamide molding compound to produce these crosslinked polyamide molded parts are additionally disclosed.

19 Claims, No Drawings

CROSSLINKABLE POLYAMIDE MOLDING COMPOUNDS AND MOLDED PARTS PRODUCED THEREWITH

RELATED APPLICATIONS

The present patent application claims priority of the European Patent Application No. EP 05 112 894.0 of Dec. 23, 2005, as well as of the international application No. PCT/EP2006/069771 of Dec. 15, 2006. The entire content of these applications is incorporated herein by explicit reference for all purposes.

RELATED FIELD OF TECHNOLOGY

The invention relates to crosslinkable, thermoplastic polyamide molding compounds, the polyamides being selected from a group comprising amorphous or microcrystalline polyamides, copolyamides thereof and blends thereof, as well as blends of such polyamides with semicrystalline polyamides. The invention additionally relates to correspondingly crosslinked polyamide molded parts.

RELATED PRIOR ART

The provision of polyamide molding compounds for producing polyamide molded parts having good transparency, chemical resistance, and high dynamic loading capacity is known from the German Laid-Open Publication DE 102 24 947 A1. Polyamide molded parts produced using such polyamide molding compounds have a melting point of 233-239° C. These polyamide molded parts are not suitable for use at temperatures above 250° C. because of this melting point.

The solubility of a premolded polyamide part in hot paracresol and its temperature-dependent susceptibility to plastic deformation ("plastic flow") at temperature above 250° C. was successfully reduced for the first time by crosslinking the polyamides by means of high-energy electron radiation (cf. U.S. Pat. No. 2,858,259).

It is known from the International Patent Application WO 03/037968 A1 that molded parts produced from crystalline thermoplastic materials by means of radiation cross-linking have a heat deformation resistance which can briefly withstand temperatures produced during soldering processes. This thermal resistance capability was attained by achieving a substantially higher degree of crosslinking by means of electron beam bombardment at the surface of the components compared with in the interior of these components. Inter alia, TAIC (triallylisocyanurate) was used as crosslinking agent.

The use of TAIC (triallylisocyanurate) is also known from EP 0 007 114 B1. For the production of polyamide films, this discloses how the crosslinking reaction proceeds with the divalent aromatic groups of the polyamide, the polymers whereof have continuously recurring units having such divalent aromatic groups. The document discloses an elevated temperature resistance and also improved electrical properties.

It is also known from the Japanese Patent Application JP 2003/327726 A2 that molded parts produced from radiation crosslinked polyamides have a heat deformation resistance that can withstand temperatures of 260° C. produced during soldering processes for 60 seconds. This thermal resistance capability was achieved by crosslinking by means of ion beam bombardment. However, a bromine-containing flame retardant, an antimony-based flame retarding adjuvant and an alumina (hydrotalzite) as another adjuvant had to be added to the melt.

None of the cited documents gives the person skilled in the art any indications about the color or the transparency of the polyamide molded parts produced.

U.S. Pat. No. 5,411,663 discloses crosslinkable, alcohol-insoluble and transparent polyamide compositions produced from amorphous, linear and alcohol-soluble polyamide polymers (type 8 nylon) by means of a crosslinking additive. In this case, the polymers undergo crosslinking among one another by acid-catalyzed molecular interaction.

EP 1 465 308 discloses another crosslinkable, transparent polyamide composition containing at least one amorphous linear polyamide and crosslinking additive. The material composition comprises at least one abrasive component and a soft and/or shrinkage component. In this case, the abrasive component in the form of a thermoplastic substance has a melting point or Tg higher than 130° C. The soft and/or shrinkage component on the other hand is a thermoplastic substance having a melting point or Tg$\leq$130° C.

EP 0 046 954 discloses further transparent polyamide compositions containing a polyamide and a crosslinking additive. The aromatic polyamide in each case contains an organic silicon compound which is preferably added as a silane coupling agent in the form X'Si(OR')$_3$. Here, X' is an organic functional group and R' is an alkyl group. Molded parts are always produced from a solution of the aromatic polyamide in a suitable solvent; these formulations are therefore not thermoplastically processable. Heat treatment above 200° C. increases the transparency of the products due to a reaction between the aromatic polyamides and the silicon compound.

OBJECT AND SUMMARY OF THE INVENTION

The object of the present invention is to provide alternative crosslinkable polyamide molding compounds which allow the production of crosslinked molded parts having significantly improved mechanical, chemical, and thermal properties as a result of the crosslinking.

This object is achieved according to a first aspect whereby a crosslinkable polyamide molding compound according to the features disclosed hereinafter is proposed. In this case, the polyamides are selected from a group comprising amorphous or microcrystalline polyamides, copolyamides thereof and blends thereof, as well as blends of such polyamides with semicrystalline polyamides. The polyamide molding compound according to the invention is characterized in that it comprises a crosslinking additive which causes the production of crosslinked molded parts formed from said polyamide molding compound under the effect of high-energy irradiation, having a Tg value of >140° C. and a minimum dimensional stability of 90% at temperatures of $\geq$180° C., wherein this polyamide has a substantially linear structure and the monomers thereof have no olefin C=C double bonds.

This object is achieved according to a second aspect whereby polyamide molded parts produced from a corresponding polyamide molding compound according to the features disclosed hereinafter are proposed. In this case, the polyamides are selected from a group comprising amorphous or microcrystalline polyamides, copolyamides thereof and blends thereof, as well as blends of such polyamides with semicrystalline polyamides.

This object is achieved according to a third aspect whereby the use of a polyamide molding compound according to the invention for producing crosslinked polyamide molded parts according to the features disclosed hereinafter is proposed.

Further preferred polyamide molding compounds, crosslinked polyamide molded parts or uses of such polyamide molding compounds or polyamide molded parts are obtained from the dependent claims.

DETAILED DESCRIPTION OF THE PRESENT INVENTION

In connection with the present invention, the term "transparent polyamide" designates (co)polyamides or (co)polyamide molding compounds having a light transmission of at least 70% when the polyamide is present in the form of a plate having a thickness of 2 mm. Circular plates of 70×2 mm are produced on an Arburg injection molding machine using the polished tool, the cylinder temperature being between 240 and 340° C. and the tool temperature between 20 and 140° C. The light transmission is measured in the standard manner on a Perkin-Elmer UV/VIS spectrometer in the range between 200 and 800 nm on such circular plates having dimensions of 70×2 mm. In each case, the transmission is given for a wavelength of 540 nm.

A first area of application of the present invention relates to the production of opto-electronic components. The demand for a more efficient method of producing electronic circuits can be met in particular if the optical lens assigned to a light-emitting diode (LED) can be mounted on the printed circuit board before contacting this LED. However, such a procedure requires that the lens is exposed to a temperature of about 260° C. during the soldering. Optical components made of crosslinked polyamide therefore form the essence of the present invention. In this case, it is extremely important that the good optical properties of the transparent polyamide are largely retained in the crosslinked state.

A particularly interesting application for transparent plastics is, for example, the offset lens for LEDs which is currently made of polycarbonate. This lens provides improved light output or increased light utilization of the LED. Since polycarbonate cannot tolerate the temperatures necessary for soldering, this effect of temperature during soldering inevitably results in distortion of the polycarbonate lens. Thus, these LEDs must be fixed together with the lens on the printed circuit boards by means of conductive adhesive. On the one hand, the process step has not really been mastered by all manufacturers and on the other hand this process step makes the production of LED-equipped printed circuit boards with optical lenses for these LEDs more expensive. Both circumstances hinder the spread of this inherently desirable technology which is growing strongly in its technical application.

The glass transition temperature (Tg) of the commercially available polyamides which would be suitable for said optical intended usage were determined in accordance with EP 0 837 087 B1 at 157° C. and the maximum is currently 215° C. Thus, despite the very good optical properties of the lenses having a density of $\leq 1.1$ g/cm$^3$, a refractive index of $n_D^{20} \geq 1.50$, and an Abbé number of >40 (cf. EP 0 837 087 B1), conventional polyamides cannot be used.

Such LEDs fitted with an offset lens are used to produce background lighting in flat or flat-panel screens.

The polyamide molding compound according to the invention of injection-molded lenses comprising a mixture of transparent polyamide and 1-10% TAIC was cross-linked under electron irradiation. Lenses manufactured in this way for LEDs can withstand the lead-free welding process which is carried out at temperatures up to above 250° C., substantially without any or with only slight distortion and without bubble formation. It has been found that by adding crosslinking agents, in particular TAIC, the processing temperature in injection molding (depending on the concentration and type) can be reduced by up to 30° C. compared with the pure polyamide. This results in a very desirable reduction or prevention of the yellowing of such lenses. The entire cycle from injection molding processing, via the irradiation as far as the reflow soldering is preferably carried out in an inert oxygen-free atmosphere so that yellowing can at least largely be avoided.

An other area of application of the present invention relates to the production of structural components such as, for example, containers, dishes and/or covers for holding or covering scientific instruments during and if necessary after sterilization. In particular, for hot air sterilization in autoclaves, a minimum temperature compatibility of 200° C. is required (cf. Scientific Opinion of the German Society for Odontology, Stomatology and Orthodontics, Version 2.0 dated May 2000). Likewise, unbreakable crockery and also transparent plate covers for use in microwave cookers can also be produced using the crosslinked, transparent polyamides according to the invention.

As has been described, polyamide molded parts produced according to the invention comprise optical components such as optical lenses for LEDs which are fixed to a printed circuit board by means of lead-free soldering before contacting the LED and/or other electronic components. In order that the optical function of these lenses is maintained, they must retain at least 90%, but preferably at least 95% of their transparency and dimensional stability. Such lenses must therefore withstand the lead-free soldering process substantially without any distortion and without bubble formation. The haze which is important for optical components is also only slightly influenced or not influenced at all by the irradiation, conditioning or reflow soldering so that reflow-soldered molded parts have a low haze of preferably $\leq 1.0$. Polyamide molded parts produced according to the invention can, however, also comprise other optical lenses or front panels and other transparent components such as, for example, optical elements or illumination inserts of medical endoscopes which must be thermally resistant for the application of repeated sterilizations, preferably for the application of hot air sterilization at least 200° C.

Vehicle manufacture may be mentioned as another area of application in which a polymer molding compound is used to produce metallic-coated light-reflecting components based on thermoplastic materials, suitable for operating temperatures of at least 180° C. Such molding compounds comprise polyamides selected from a group consisting of homopolyamides, copolyamides as well as mixtures (blends) of homopolyamides and copolyamides, and mixtures of homopolyamides or copolyamides, these polyamides being selected from a group comprising amorphous and transparent polyamides and these polyamides having a glass transition temperature (Tg) of at least 180° C. At the same time, the transparent polyamide molding compound crosslinked according to the invention can be used for producing the high-temperature-resistant supporting layer of these light-reflecting components. In this case, it is possible to use inexpensive polyamides which, for example, have a glass transition temperature of only 140° C. (in the dry state) but thanks to their low viscosity are especially well suited for injection molding. By adding crosslinking agents, in particular TAIC the injection molded parts can then be crosslinked and their short-term usage temperature thereby increased to values above 250° C. A thin layer of the crosslinked polyamide molding compound according to the invention can then be sprayed on or laminated as a film as a protective layer for the reflecting layer (which normally consists of aluminum) in these light-reflecting components.

It is additionally advantageous if the crosslinked transparent molded parts have a significantly better resistance to chemicals and solvents compared to noncrosslinked molded parts.

In connection with the present invention, "olefin monomers" are so defined that these contain isolated or conjugated C=C double bonds which are radically or ionically polarizable. It is generally known that C=C double bonds in olefins (i.e., in alkenes and cycloalkenes) have a significantly higher reactivity towards aromatic systems and therefore under conditions of high-energy irradiation such as, for example, electron irradiation provide a stimulus for spontaneous crosslinking reactions.

Aromatic compounds have a significantly higher chemical resistance and primarily preferably undergo reactions in which the aromatic structure is retained. Aromatic compounds are considered inter alia to be particularly stable to radiation. For the same radiation dose and time the crosslinking effect is significantly lower than, for example, for aliphatic compounds.

Consequently, polyamides having an aliphatic and/or cycloaliphatic and/or partially aromatic character are used exclusively for the cross-linkable and thermoplastically processable polyamide molding compounds according to the invention. Fully aromatic polyamides are therefore not included in the molding compounds according to the invention.

Crosslinking agents are polyfunctional, mostly low-molecular compounds. These crosslinking additives promote crosslinking reactions and comprise at least one group having the formula (I), (II), (III) and/or (IV):

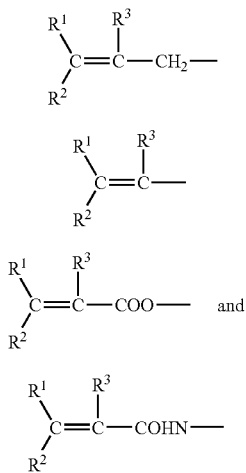

wherein $R^1$, $R^2$, or $R^3$ independently of one another represent hydrogen or an alkyl group having 1 to 6 carbon atoms, or have the following structural formula (V) or (VI):

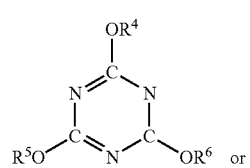

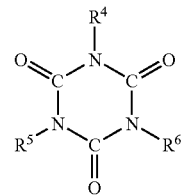

wherein $R^4$, $R^5$ or $R^6$ independently of one another represent an alkyl group having 1 to 10 carbon atoms, a hydroxylalkyl group having 1 to 10 carbon atoms, a carboxyalkyl group having 1 to 10 carbon atoms or a halogenated alkyl group having 1 to 10 carbon atoms. Preferred examples of such crosslinking agents comprise triallylcyanurate, triallylisocyanurate, diallylcyanuric acid, tris(2-hydroxyethyl)-cyanuric acid, tris(2-carboxyethyl)cyanuric acid, diallylisophthalate, diallylcarbonate (e.g. diethyleneglycol-bis (allylcarbonate), diallylmaleate, trimethylolpropantrimethacrylate, ethyleneglycoldimethacrylate and divinylbenzene.

The crosslinking agents are usually used in concentrations up to 10 wt. %, preferably up to 7 wt. %, and especially preferably up to 4 wt. %. Before the forming treatment (e.g. injection molding or extrusion) is carried out, the crosslinking agents are applied to the granules of the polyamides used, i.e. preferably pounded onto the polyamide granules in liquids or powdered on in the dry process. One possibility for adding especially high quantities of liquid is obtained on the basis of so-called microfoamed granules (cf. the product available on the market ACCUREL® from Membrana GmbH, 63784 Obernburg, Germany). In this process the crosslinking agent is received into the cavities of the hollow chamber granules and does not adhere merely to the surface thereof as in the case of usual granules. However, it does occur that after some time the crosslinking agent diffuses into the interior of the conventional granules.

The following polyamide compositions can be considered, for example, as transparent polyamides:

1. A polyamide constructed from branched or unbranched, aliphatic or cycloaliphatic diamines, preferably from PACM and/or MACM and from aliphatic dicarboxylic acids having 8 to 36 C atoms, wherein C10, C12, C13, C14, and C18 dicarboxylic acids are specially preferred. Such polyamides are, for example, the homopolyamides MACM12, MACM18, or PACM12 or the copolyamides MACM12/PACM12, MACM18/PACM18.

2a. Polyamides comprising aromatic dicarboxylic acids having 8 to 18 C-atoms, terephthalic acid (TPS) and isophthalic acid (IPS) being preferred. The diamines in this case are preferably aliphatic or cycloaliphatic. Exemplary polyamides are 6I/6T, TMDT, 6I/MACMI/MACMT, 6I/PACMI/PACMT, 6I/6T/MACMI, MACMI/MACM36 and 6I.

2b. Polyamides comprising lactams and/or aminocarboxylic acids as monomers. Exemplary lactam-containing polyamides are 12/PACMI, 12/MACMI, 12/MACMT, 6/MACMT, 6/6I, and 6/IPDT.

3. Polyamides comprising diamine, having an aromatic core such as, for example, MXDA. The dicarboxylic acids have an aromatic and/or aliphatic structure. An exemplary polyamide is the copolyamide 6I/MXDI.

The invention also comprises transparent blends of transparent (i.e. amorphous or microcrystalline) polyamides as well as transparent blends of such transparent polyamides with semicrystalline polyamides. Preferred transparent blends of transparent polyamides with semicrystalline polyamides have a transmission of over 70% and comprise GRILAMID TR 90 (known as PA MACM12 in the IUPAC nomenclature) as well as up to 40 wt.-% polyamide 12 (PA 12). Particularly preferred blends comprise GRILAMID TR 90 (or PA MACM12) and up to 20 wt.-% PA 12.

In a particular embodiment, the crosslinked molded parts produced according to the invention have a transmission of over 70%, preferably of over 80%, and especially of over 85%. Such transparent molded parts have a haze of less than 7%, preferably less than 5%, and especially less than 3%.

As Example 1 (see Table 2) shows, high-quality optical molded bodies such as lenses, for example, can be produced on the basis of high-purity raw materials, which, after crosslinking has taken place, have a transmission of over 88% and a haze of less than 1.5%.

Lenses of crosslinked polyamides of the type 1 just defined have a density of $\leq 1.1$ g/cm$^3$, a refractive index of $n_D^{20} \geq 1.50$, and an Abbé number of >40. Lenses of crosslinked polyamides of the type 3 just defined have a density of <1.3 g/cm$^3$, a refractive index of $n_D^{20} > 1.59$, and an Abbé number of >25. Lenses of crosslinked polyamides of the types 2a and 2b just defined have characteristic values which lie between the extreme values of types 1 and 3.

Preferably used are polyamide molding compounds which can be used to produce polyamide molded parts having a glass transition temperature (Tg) of at least 140° C. Tg $\geq$ 150° C. is preferred and Tg $\geq$ 170° C. is especially preferred.

The invention will be explained in detail hereinafter with reference to examples.

Example 1

Respectively 0, 2 or 3 wt. % TAIC (TAICROSS® from Degussa) was applied to the predried granules of the selected polyamide and tumbled in a mixer for 60 minutes. Samples measuring 60×10×1 mm and circular plates having a diameter of 70 mm and a thickness of 2 mm were produced by means of an Arburg 305-210/210-700 injection molding machine. For GRILAMID TR 90 (PA MACM12) the cylinder temperatures were in the range of 240° C. to 280° C. and for TR FE5577 (PA 6I/MXDI) in the range of 260° C. to 300° C. The test rods were used to make a qualitative assessment of the yellowing, the bubble formation, and the distortion. The circular plates which were produced with the aid of a polished tool were used to determine the transmission and the haze.

The samples were welded spray-dry in aluminum containers and irradiated with electrons in this form. The electron irradiation was carried out at Beta-GammaService in Bruchsal (Germany) on a 10 MEV electron accelerator installation having a radiation dose of 33 kGy per pass. The higher doses were achieved by repeated passage of the samples through the irradiation zone.

After the irradiation, the samples were subjected to a reflow soldering process directly (dry) or after conditioning (Joint Industry Standard: IPC/JEDEC J-STD-020C, Moisture Sensitive Level 2, July 2004). For this purpose the samples passed through a temperature/time profile consistent with the standard IPC/JEDEC J-STD-020C in a full-convection ESSEMTEC 300 FC reflow soldering furnace. In this case, the peak temperature of 260° C. was maintained for more than 40 seconds. The transmission was determined using the circular plates at a wavelength of 540 nm by means of a PERKIN ELMER UV/VIS spectrometer. The haze values were determined using the HAZE-GARD PLUS from Byk-Gardener in accordance with ASTM D1003.

Table 1 summarizes the results using the dry samples and Table 2 summarizes those using the conditioned samples.

TABLE 1

Results after reflow process (dry, without conditioning)

| | | Radiation dose [kGy] | | | | | | | | | | | |
|---|---|---|---|---|---|---|---|---|---|---|---|---|---|
| | | 0 | | | 66 | | | 99 | | | 132 | | |
| Material | TAIC [%] | 0 | 2.0 | 3.0 | 0 | 2.0 | 3.0 | 0 | 2.0 | 3.0 | 0 | 2.0 | 3.0 |
| TR 90 | Yellowing | ++ | ++ | ++ | + | + | + | + | + | + | + | + | + |
| | Bubble formation | – | –– | –– | – | ++ | ++ | – | ++ | ++ | –– | ++ | ++ |
| | Distortion | –– | –– | –– | –– | + | + | –– | ++ | ++ | –– | ++ | ++ |
| | Transmission | nd | nd | nd | nd | 90 | 89 | nd | 90 | 89 | nd | 89 | 89 |
| | Haze | nd | nd | nd | nd | 0.8 | 0.8 | nd | 0.8 | 0.9 | nd | 0.8 | 0.9 |
| TR FE5577 | Yellowing | + | + | + | + | + | + | ○ | ○ | ○ | ○ | ○ | ○ |
| | Bubble formation | –– | –– | –– | –– | ○ | + | –– | + | ++ | –– | + | ++ |
| | Distortion | –– | –– | –– | –– | ○ | + | –– | + | ++ | –– | ++ | ++ |

TABLE 2

Results after reflow process (after conditioning according to the Standard IPC/JEDEC J-STD-020C MSL2)

| | | Radiation dose [kGy] | | | | | | | | | | | |
|---|---|---|---|---|---|---|---|---|---|---|---|---|---|
| | | 0 | | | 66 | | | 99 | | | 132 | | |
| Material | TAIC [%] | 0 | 2.0 | 3.0 | 0 | 2.0 | 3.0 | 0 | 2.0 | 3.0 | 0 | 2.0 | 3.0 |
| TR 90 | Yellowing | + | + | + | + | + | + | + | + | + | + | + | + |
| | Bubble formation | –– | –– | –– | –– | + | ++ | –– | ++ | ++ | –– | ++ | ++ |
| | Distortion | –– | –– | –– | –– | ○ | + | –– | + | + | –– | + | ++ |

TABLE 2-continued

Results after reflow process (after conditioning according to the Standard IPC/JEDEC J-STD-020C MSL2)

| Material | | Radiation dose [kGy] | | | | | | | | | | |
|---|---|---|---|---|---|---|---|---|---|---|---|---|
| | | 0 | | | 66 | | | 99 | | | 132 | |
| | TAIC [%] | 0 | 2.0 | 3.0 | 0 | 2.0 | 3.0 | 0 | 2.0 | 3.0 | 0 | 2.0 | 3.0 |
| TR FE5577 | Transmission | nd | nd | nd | nd | 90 | 89 | nd | 89 | 89 | nd | 89 | 89 |
| | Haze | nd | nd | nd | nd | 0.8 | 0.9 | nd | 0.8 | 0.9 | nd | 0.8 | 1.0 |
| | Yellowing | + | + | + | o | o | o | o | o | o | o | o | o |
| | Bubble formation | -- | -- | -- | -- | o | o | -- | o | ++ | -- | + | ++ |
| | Distortion | -- | -- | -- | -- | o | + | -- | + | ++ | -- | ++ | ++ |

Legend to Tables 1 and 2:

Yellowing: ++ very low (Δ Yellow Index <2), + (Δ Yellow Index=2-4) o (Δ Yellow Index=4-7) – (Δ Yellow Index=8-10), -- high (Δ Yellow Index >10)

Distortion: ++ very little distortion, -- strong distortion

Bubble formation: ++ no bubbles, + isolated small bubbles, o few small bubbles, – significant bubble formation, -- molded part completely covered with bubbles nd: not determined The Yellow Index was determined using the Dr. Lange Color-Pen LMG 159 in accordance with DIN 6167.

Before the reflow soldering, GRILAMID TR 90 has a Yellow Index of 1.5, a haze of 0.8% and a transmission determined at 540 nm as standard of 91%. The Yellow Index of TR FE5577 is 10.

The gel fraction was determined from the solubility of the irradiated samples in solvents suitable for polyamide. The gel fraction corresponds to the insoluble fraction of the sample in the solvent and is given in wt. %. In each case, unirradiated material, where the gel fraction is <1% was examined as a reference. The gel fraction was determined for samples of GRILAMID TR 90 comprising a mixture of trifluorethanol and chloroform in the ratio 3:2 at 23° C. and for samples of GRILAMID TR FE5577 with benzylalcohol at 180° C. (for 8 hours in each case).

TABLE 3

Gel fraction of the electron-irradiated samples

| | Dose [kGy] | | | | | |
|---|---|---|---|---|---|---|
| | 66 | | 99 | | 132 | |
| TAIC [%] | 2 | 3 | 2 | 3 | 2 | 3 |
| TR 90 | 78 | 90 | 89 | 96 | 92 | 98 |
| TR FE5577 | <1 | <1 | 5 | 25 | 40 | 55 |

Example 2

GRILAMID TR 90 was processed on a tool known per se for the injection molding of optical lenses for LEDs on a DEMAG Ergotech 35-120 injection molding machine having a 25 mm screw. The tool was an electrically heated quadruple tool having a cold channel and pin-point gates. The cylinder temperatures were between 240 and 280° C. The following two material variants were available:

A) GRILAMID TR 90 natur with 3 wt. % TAIC (liquid beaten);
B) GRILAMID TR 90 natur with 12 wt. % Master batch, consisting of 75% GRILAMID TR 90 natur and 25% TAIC GRILAMID TR 90 (PA MACM12) with liquid beaten TAIC (Variant A) has a moist-sticky consistency immediately after introducing the additive but can easily be drawn in and processed. Variant B in which TAIC is added in the form of a master batch also shows unproblematical dosing and processing behavior.

The LED lenses were measured for their 3D imaging accuracy in relation to the molding post. Extremely good values were found for both GRILAMID TR 90-variants such as had never been observed hitherto for plastic lenses.

The LED lenses were welded spray-dry in aluminum containers and irradiated with electrons in this form. The electron irradiation was carried out as described in Example 1. The dose was 99 kGy.

After the irradiation, variants A and B, either pre-dried or conditioned (IPC/JEDEC J-STD-020C, Moisture Sensitive Level 2), were subjected to the reflow soldering process in accordance with the standard IPC/JEDEC J-STD-020C in an ESSEMTC 300FC soldering furnace. Yellowing, bubble formation and distortion were again assessed qualitatively and the results are presented in Table 4.

TABLE 4

Qualitative assessment of the LED lenses after reflow soldering

| Material | Yellowing | Bubble formation | Distortion |
|---|---|---|---|
| A dry | + | ++ | ++ |
| A conditioned | + | ++ | + |
| B dry | o | ++ | + |
| B conditioned | o | ++ | + |

To explain these results, reference is made to the legend to Tables 1 and 2.

The crosslinked transparent samples and LED offset lenses of GRILAMID TR 90 showed very good soldering resistance from a concentration of 2% TAICV and a radiation dose of 66 kGy. That is, no bubbles were detected in or on the surface of the molded part during the reflow soldering which was carried out in accordance with the Joint Industry Standard IPC/JEDEC J-STD-020C. In addition, the distortion of the molded part is very low. In order to achieve the same soldering strength in partially aromatic FE5577, a higher radiation dose (99 kGy) and a TAIC concentration of at least 3% was required. In particular, no bubble formation occurred during lead-free soldering when the irradiated molded parts were conditioned in accordance with the Joint Industry Standard IPC/JEDEC J-STD-020C, MSL2. The radiation dose used according to the invention is greater than 50 kGy, a dose in the range between 60 and 100 kGy preferably being used.

The offset lenses were usually injection-molded separately in their own tools and placed on or clipped onto the LED housing after irradiation. The offset lenses were then caulked or riveted. Alternatively, the fully assembled LED can be inserted as an insertion part into an injection molding tool and a lens, e.g. made of TR 90 or TR FE 5577 can then be injection-molded onto this LED (similar to the two-component injection molding process) in so-called "assembly injection molding". This has the advantage that the lens can be made smaller. As a result, the dimensional deviation will be smaller, the optical coupling in/out of light will be more efficient and no wobble or sealing problems will arise. In general, GRILAMID TR is processed at lower temperatures than the LED reflector housing of GRIVORY HT. If the attainable composite adhesion is not adequate for a good join, an adhesive layer and/or a positive closure can be provided, FE5577 has advantages over GRILAMID TR 90 in regard to the composite adhesion to GRIVORY HT.

Despite the fraction of up to 5% TAIC in the polyamide molding compound, the lenses having a density of $\leq 1.1$ g/cm$^3$, a refractive index of $n_D^{20} \geq 1.50$ and an Abbé number of >40 exhibit very good optical properties such as are otherwise only attainable in noncrosslinked polyamides (cf. EP 0 837 087 B1). The present invention thus makes it possible to produce lenses for LEDs which can withstand the lead-free soldering process almost free from distortion and bubble formation.

Examples 3, 4, 5, and 6

The transparent polyamides MACM12 (Grilamid TR 90) and PA MACMI/12 (molar ratio: 81:19) were rolled into the compositions with TAIC given in Table 5 and processed on an ENGEL ES 330/80 injection molding machine at cylinder temperatures in the range of 240° C. to 300° C. to form cups. These cups had a height of 90 mm, an upper diameter of 70 mm, a lower diameter of 55 mm and a wall thickness of 1.5 mm. The cups were then welded spray dry in aluminum containers and irradiated with electrons in this form, as has already been described in Example 1. The total dose was 99 kGy.

TABLE 5

Compositions and results of Examples 3 to 6

| Example | 3 | 4 | 5 | 6 |
|---|---|---|---|---|
| Composition and Tg of molding compounds | | | | |
| MACM12 [wt. %] | 97.0 | 29.1 | 29.4 | 0 |
| MACMI/12 [wt. %] | 0 | 67.9 | 67.6 | 97.0 |
| TAIC [wt. %] | 3.0 | 3.0 | 3.0 | 3.0 |
| Glass transition temperature (Tg) [° C.] | 155 | 180 | 190 | 200 |
| Result of fatigue temperature test | | | | |
| Noncrosslinked molded body Temperature at which deformation of the cup occurs [° C.] | 183 | 192 | 203 | 206 |
| Crosslinked molded body Temperature at which deformation of the cup occurs [° C.] | 210 | 230 | 237 | 260 |

A test structure consisting of a cup fixing, a central lamp holder with a halogen lamp (H11), a temperature sensor and a transformer was used for the fatigue temperature testing after irradiation. The cup base had to be removed in each case so that the transparent cups could be inserted via the lamp into the holder. The transparent cups were then fixed horizontally in the test structure on a frontside, perpendicular plate so that the interior of the cup formed a closed space. In this case, the illuminant of the halogen lamp projected through the open base of the cup completely into the interior of the cup which had its smaller cross-section oriented toward the lamp holder. The luminosity and therefore the temperature acting on the inside of the cup could be adjusted by adjusting the lamp voltage. In the tests described here, the transformer voltage, starting from a starting voltage of 11.0 volts, was increased in regular intervals over 4 to 6 hours to the voltage at which the first deformation occurred at the cup, resulting from the increase in temperature caused thereby. This voltage was a maximum of 19.5 Volts. The temperature was recorded by means of a sensor which was attached via a hole (diameter: 3 mm) in the cup on the inside, perpendicular to the halogen lamp. The specified voltage interval corresponded to a temperature range of 125° C. to 260° C. at the measurement location. The test was discontinued in each case when the first deformations of the cup could be observed. Table 5 gives these temperature values in each case for cups having a noncrosslinked and crosslinked composition.

Examples 3 to 6 clearly show that the heat forming resistance in the mechanically unloaded state can be increased by about 30° C. to 50° C. by crosslinking.

The molded parts according to the invention made of transparent polyamide molding compounds could be subsequently tinted or colored or doped with the aid of so-called coloring or functional baths and function additives contained therein. The temperature of the dipping baths or function baths used for this purpose lies below or also above the glass transition or glass conversion temperature (Tg) of the (co)polyamides. The latter is possible since the molded parts retain their shape as a result of the crosslinking even at temperatures above the Tg value. If according to a particular embodiment of the invention, the molded parts are to be tinted or colored, the coloring can be carried out as homogenous coloring or as graded coloring.

Homogeneous dye distributions in a molded part or in a material composite comprising such a molded part are obtained using dipping bath additives comprising a suitable combination of glycols and by means of a special dipping process according to the German Patent Application DE 102005017321.7 of the present applicant. In this case, low haze values (opacity values) of $\leq 1\%$ can be achieved at color depths having a light transmission of 10 to 93%, preferably of 10 to 80%, particularly preferably of 10-60%, wherein in each case one high-gloss defect-free surface of the molded part is retained. Thus, all shades including gray can be obtained with the aid of suitable primary colors.

The colored molded parts or material compositions can be coated with primers or hard varnish in conventional dipping baths without the color bleeding out, these being cured thermally or with UV radiation. Likewise layers for antireflection equipment or anticoating equipment can be applied. The adhesion of these layers is not impaired. Polarization films can also be adhesively bonded after the dip coloring and these are then refined with hardcoat and antireflection layers and/or anticoating layers. This process can also be used to dope in functional additives in the molded body such as, for example, in films or in plates. These functional additives comprise UV additives, photochromic or thermochromic additives, contrast-enhancing additives and additives which influence the refractive index.

Impermeability for harmful UV radiation is increasingly required for transparent materials in external applications.

This primarily relates to UV radiation having a wavelength below 430 nm, in particular below 400 nm, or even below 385 nm. Such impermeability can be achieved in transparent polyamide molded parts by incorporating usual UV absorbers into the polyamide molding compound, in particular in the form of chlorine-activated benzotriazoles such as, for example, Tinuvin 326, Tinuvin 327 or derivatives thereof. Mixtures with so-called "Hindered Amine Light Stabilizers" (HALS) additives have proved successful.

The combination of optical lighteners and UV absorbers results in the improved appearance of polyamide molded parts while at the same time having a protective action against harmful UV radiation. Since various UV protection classes are required on the market, it is advantageous to add the UV protection by means of a suitable master batch directly before manufacturing the molded part. Depending on the quantity and type of the UV master batch, the light transmission can be directly adjusted for a protection class corresponding to wavelengths of 385 nm, 400 nm or higher.

Further additives can be added to the crosslinking polyamide molding compound according to the invention:
- Other polymers such as, for example, polymer flow agents (cf. for example, EP 1 120 443 A2), polymer flame retardants or tougheners, possibly isorefractively grafted core-shell polymers;
- Fillers or reinforcing materials such as isorefractive glass fibers pr glass balls as well as nanoscale inorganic materials such as, for example, ultrafine chalk having a maximum average particle size of 100 nm and preferably a maximum of 80 nm or organically modified layer silicates having a maximum average particle size of 100 nm (cf. European Patent Application EP 1 416 010 A2 of the current applicant) as well as nanoscale metal oxides, in particular nanoscale $TiO_2$.
- Pigments, other coloring agents, softeners, antistatics, mold release agents, flow agents, flame retardants, and the like.

The molded parts are used, for example, for producing optical bodies. Optical bodies are those through which light passes, which reflect light or absorb light. This light can be reflected or absorbed, can pass through, for example, as focused, converging or diverging and can be perceived with the eye or produce an effect which is perceivable with the eye at the outlet side of the molded part. For example, such molded parts can be optical lenses for spectacles, in particular sunglasses, cameras, binoculars, magnifying lenses, microscopes, electrooptical measuring and test equipment, optical filters, headlamp lenses, in particular lenses in the covers for the driving lighting of automobiles and other vehicles, lamp lenses, lenses for projectors and video projectors, viewing windows, sight glasses, protective panes and visors as well as sunroofs and glazing in the building and automobile sector. In addition, transparent molded parts, fibers or films can be produced for numerous applications such as packaging for foodstuffs, medicinal products and cosmetics, or films for agriculture or horticulture. In addition, protective layers can be produced on most of the aforementioned molded parts from transparent polyamide molding compounds crosslinked according to the invention, for example by laminating or in-mold decoration.

The invention claimed is:

1. Transparent crosslinked polyamide molded part produced from a thermoplastic polyamide molding composition, wherein said thermoplastic polyamide molding composition is transparent and comprises a blend of:
   (a) one of an amorphous polyamide, a transparent microcrystalline polyamide, a copolyamide of an amorphous polyamide and a transparent microcrystalline polyamide, or a blend thereof, and
   (b) a semicrystalline polyamide,
   said semicrystalline polyamide being present in the transparent blend of (a) and (b) in an amount of 1 to 40 wt. %,
   said amorphous polyamide or said transparent microcrystalline polyamide or said copolyamide of (a), and said semicrystalline polyamide of (b)
   i. being non-aromatic and being devoid of N-alkoxy-alkyl substituted amide groups, and
   ii. having a substantially linear structure and being constructed from monomers devoid of olefinically unsaturated C=C double bonds,
   wherein the polyamide molding composition comprises a cross-linking additive, the polyamides in said polyamide molded part being cross-linked by said cross-linking additive as a result of electron irradiation, and
   wherein said cross-linked polyamide molded part has a Tg value of >140° C. and a minimum dimensional stability of 90% at temperatures of ≧180° C.

2. The transparent crosslinked polyamide molded part according to claim 1,
   wherein the semicrystalline polyamide is PA 12.

3. The transparent crosslinked polyamide molded part according to claim 1,
   wherein the transparent blend comprises PA MACM12 as an amorphous polyamide and an amount of PA 12 as a semicrystalline polyamide not to exceed 20 wt. %.

4. The transparent crosslinked polyamide molded part according to claim 1,
   wherein the molded part is a structural component which, despite the action of temperature above 200° C., retains a minimum dimensional stability of 95%.

5. The transparent crosslinked polyamide molded part according to claim 1,
   wherein the molded part is an optical component which, despite a temperature of 260° C., retains transparency and a minimum dimensional stability of 90%.

6. The transparent crosslinked polyamide molded part according to claim 5,
   wherein the optical component has a light transmission of higher than 70%.

7. The transparent crosslinked polyamide molded part according to claim 6,
   wherein the optical component has a light transmission of higher than 80%.

8. The transparent crosslinked polyamide molded part according to claim 5,
   wherein, despite a temporary temperature loading of 260° C., the optical component has a refractive index of at least 1.50, an Abbé-number of at least 40, and a density of at most 1.1 g/cm³.

9. The transparent crosslinked polyamide molded part according to claim 5,
   wherein the molded part is an optical lens for LEDs which is fixed on a printed circuit board before lead-free soldering of the LEDs.

10. The transparent crosslinked polyamide molded part according to claim 1,
    wherein the molded part is injection molded or extruded.

11. The transparent crosslinked polyamide molded part according to claim 1,
    wherein the glass transition temperature (Tg) of the polyamide molded part is higher than 150° C.

12. The transparent crosslinked polyamide molded part according to claim 11, wherein the glass transition temperature (Tg) of the polyamide molded part is higher than 170° C.

13. The transparent crosslinked polyamide molded part according to claim 1,
wherein the molded part is a light-reflecting structure for vehicles and has a glass transition temperature (Tg) of at least 180° C.

14. The transparent crosslinked polyamide molded part according to claim 1,
wherein the concentration of the crosslinking additive is 1% up to 10 wt. % of the polyamide molding composition.

15. The transparent crosslinked polyamide molded part according to claim 14,
wherein the concentration of the crosslinking additive is 1% up to 7 wt. %.

16. The transparent crosslinked polyamide molded part according to claim 1,
wherein the crosslinking additive is triallylisocyanurate (TAIC) and the concentration thereof is 1 to 5 wt. % of the polyamide molding composition.

17. The transparent crosslinked polyamide molded part according to claim 1,
wherein the polyamide molding composition comprises an amorphous or transparent microcrystalline polyamide built up from a cycloaliphatic diamine and an aliphatic dicarboxylic acid having 6 to 36 C atoms.

18. The transparent crosslinked polyamide molded part according to claim 17,
wherein the polyamide molding composition comprises polyamide built up from PACM and/or MACM and an aliphatic dicarboxylic acid, the dicarboxylic acid being selected from the group consisting of an acid of 10, 12, 13, 14 or 18 C atoms.

19. The transparent crosslinked polyamide molded part according to claim 1,
wherein the polyamide molding composition comprises an amorphous or transparent microcrystalline polyamide built up from a lactam and/or an aminocarboxylic acid.

* * * * *